Dec. 15, 1959   G. B. WILKES, JR   2,916,808
METHOD OF MAKING A BLADE FOR TURBOMACHINES
Filed March 28, 1955
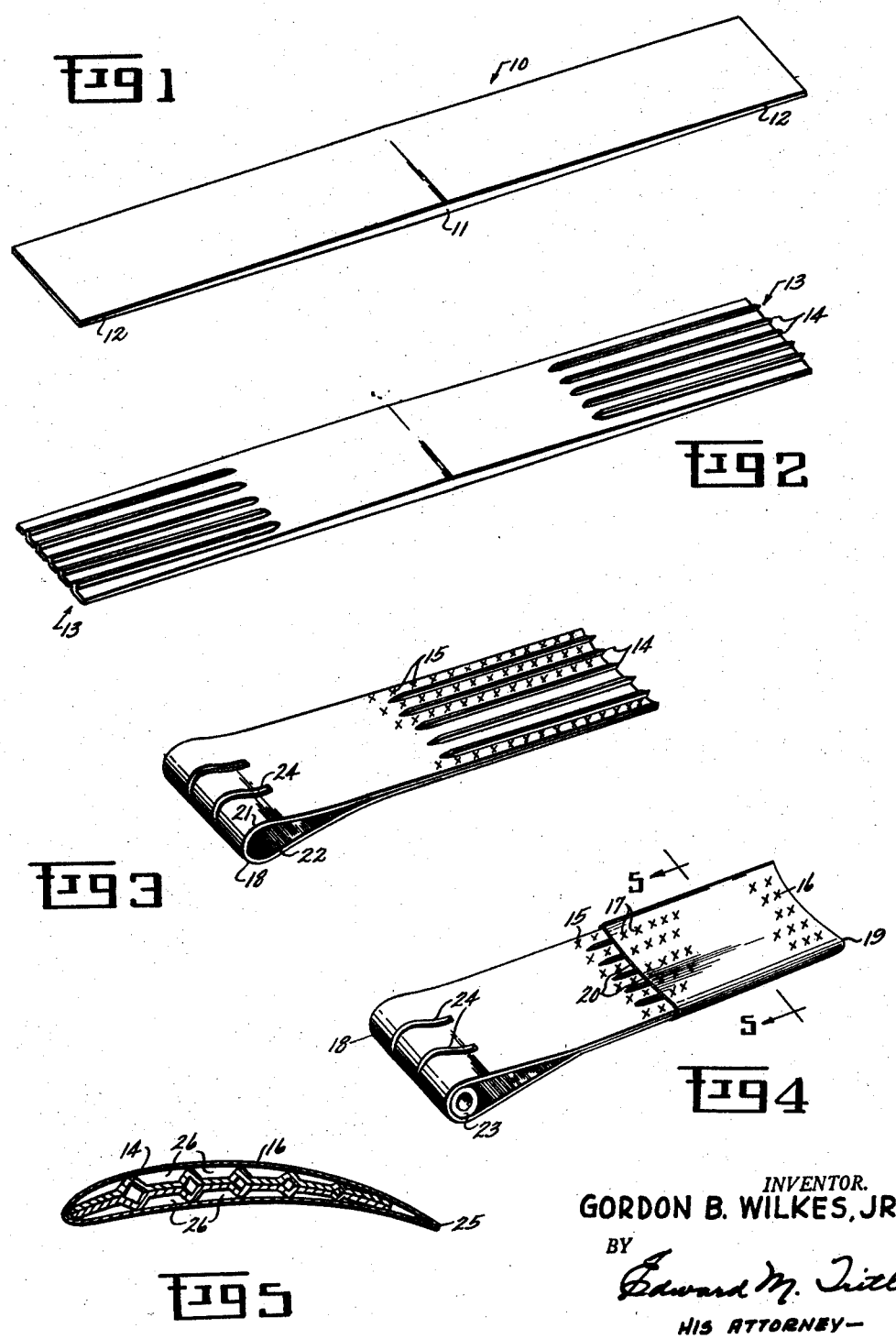
INVENTOR.
GORDON B. WILKES, JR.
BY
HIS ATTORNEY—

2,916,808

United States Patent Office
Patented Dec. 15, 1959

---

2,916,808

METHOD OF MAKING A BLADE FOR TURBOMACHINES

Gordon B. Wilkes, Jr., Lynnfield Center, Mass., assignor to General Electric Company, a corporation of New York Application March 28, 1955, Serial No. 497,101

6 Claims. (Cl. 29—156.8)

This invention relates to rotor blades for turbines, compressors, blowers or the like, and to a method of making such blades. More particularly, the invention relates to a novel sheet metal blade and the method of making it. While the specific disclosure relates to a blade or a bucket for the turbine of a gas turbine powerplant, it will be obvious that the invention is applicable to other apparatus such as compressors, blowers and the like and especially to buckets that are to be subjected to high temperatures.

The use of hollow sheet metal blades for buckets for gas turbines is a common expedient to reduce weight and provide means for the internal circulation of cooling fluid. Diaphragms have even been introduced into the hollow blade to guide the cooling medium. See, for example, U.S. Patent No. 2,559,131 to Oestrich. However, the blades so made have been difficult to fabricate even when made from sheet metal blanks or have been so constructed that the airfoil or outer section, which must withstand the high temperatures, has been too heavy, when the complete blade is separately fabricated, to resist the loads and heat to which it is constantly subjected. The metals that will meet these two conditions are not cheap, and the result is that the blade cost is high, and with many blades per wheel, the turbine cost is high.

Accordingly, the main object of my invention is to provide a separate complete blade and a method of making it, wherein the heat resistant or airfoil part of the blade is lighter than heretofore believed possible and requires a minimum of material. At the same time, the blade can be adequately cooled with air to withstand much higher gas turbine inlet temperatures.

A further object is to provide a separate blade and the method of making it wherein the main structural or load bearing member or strut is located internally of the blade and is protected from high temperature gases to which it is subjected.

Another object is to provide a separate complete blade that is completely fabricated from sheet metal in a series of simple steps.

Briefly stated, according to the invention, a blank of material is cut from stock, preferably with a thickness taper, to the form of the developed blade. The blank, at the same time, is contoured and has its ends corrugated or ridged. Then the blank is folded into a U-shape with the legs of the U pressed together to bring the corrugated end portions into contact or abutting alignment with one another and a thin airfoil or skin portion is wrapped around the contacting portions and secured as by welding thereto to join the airfoil and the two corrugated end portions to each other.

My invention will be better understood from the following description taken in connection with the accompanying drawings and its scope will be pointed out in the appended claims. In the drawings:

Figure 1 is a perspective view of the cut blank of the developed blade showing taper;

Figure 2 is a perspective view of the cut blank showing the corrugations thereon;

Figure 3 is a perspective view of the blank folded over to form a welded rudimentary blade and showing two means of securing the halves together;

Figure 4 is a perspective view of the rudimentary blade with the shell or airfoil section added and showing part of the welding used and;

Figure 5 is a cross-sectional view taken on line 5—5 of Figure 4.

Referring first to Figure 1, there is shown a blank 10 from which the load bearing internal strut is formed. The strut is made from a flat strip of suitable material that has been rolled preferably with a taper so that the central section 11 is thicker than the end sections 12. The taper thus allows for increasing load toward the base as will later appear.

The blank just described has stamped or otherwise formed thereon at its end portions, at the time it is cut, a series of corrugations generally indicated as 13, as seen in Figure 2, to form a series of ridges 14. As part of the same operation, the end portions may be contoured. The strip or blank is then folded in the middle into a U-shape and the two corrugated ends are brought together into abutting alignment and preferably are spot or seam welded to each other as at 15 in Figure 3 throughout the length of the corrugations and preferably slightly beyond to form the strut.

While the securing welds 15 are shown, in the preferred execution, in each groove between the ridges 14, it will be apparent that corrugations 13 may be abutted at the two edges only of the strut and suitably secured, in which case the center portions of the strut are unconnected to each other. Such construction is shown on the lower half of Figure 3 wherein welds 15 are omitted from the two grooves between ridges 13 and the lower edge of the strut is shown welded. Such a modification leaves the central portion of the strut unconnected and provides additional space between the two halves of the blank 10 as seen in Figure 5 instead of the continuous abutment shown.

Next, a thin airfoil shaped shell 16 of suitable material is wrapped around the strut to form the airfoil and is suitably secured as by welding or brazing to the ridges 14 as at 17 to form a turbine bucket or blade. While a number of welds 15 and 17 have been shown, fewer may be used to provide suitable securement.

As seen in Figure 4, the airfoil shaped shell 16 preferably extends substantially the length of corrugations 13 toward the root section 18 in one direction and to the end of the corrugations or slightly beyond at the blade tip 19 in the other direction. Openings 20 are thus formed between the airfoil shell and strut to permit the entrance of cooling air which passes lengthwise of the blade inside of the shell and emerges at the blade tip 19.

The bucket is formed, when folded, with a bend 21 at the bight of the U having an opening 22 to permit the insertion of a hinge pin with or without bushing 23 or other similar means for a hinge to attach the bucket to a wheel in a conventional manner as shown in the above Oestrich patent. In addition, slots 24 may be provided, preferably at the time the blank is cut and the corrugations formed, for attachment to a wheel as shown in my copending application, Serial No. 505,811, filed May 3, 1955.

Figure 5 illustrates how the shell 16 is seam welded to itself at 25 to form the trailing edge of the bucket. Passages 26 are provided between the shell 16 and corrugations 13 in the strut for the passage of cooling air which is supplied to the passages through openings 20 and progresses outwardly along the bucket between the shell and strut to emerge at the blade tip 19 where it combines with the products of combustion. As stated above, with respect to the modified form, partially illustrated in Figure 3, in order to permit this method of construction to conform to any reasonable airfoil shape, the corrugations of the strut may abut at leading and trailing edge only leaving a hole in the center which would not normally be used for cooling air.

It is to be noted, in Figure 5, that the internal strut is heavier than the outer airfoil shaped shell 16 so that the loads normally encountered by a turbine bucket are taken by the internal strut and not by the shell 16. The central heavier section 11, described above, is now at the blade base where the loads are greatest. This construction permits shell 16 to be of thin gauge which promotes rapid and efficient cooling. In addition, the design of the bucket is such that, when fastened to a wheel as disclosed in said copending application, high damping is obtained which aids materially the vibration problem normally encountered in a turbine. Further, the bucket design permits a considerable weight reduction over that of a conventional bucket and its center of gravity is closer to the shaft around which it rotates, to provide a decrease in load that has to be carried by the turbine wheel.

The bucket is easily fabricated since it requires only a rolling step, a stamping, a folding, and a series of seam or spot welds to form the internal strut. The airfoil shaped shell 16 is wrapped on the strut and secured as by spot or seam welding or brazing to the strut and preferably seam welded to itself at the trailing edge.

While I have described my invention in detail and its present preferred embodiment, it will be obvious to those skilled in the art, after understanding my invention, that various changes and modifications may be made therein without departing from the spirit or scope thereof, as defined in the appended claims.

What I claim is:

1. The method of making a rotor blade for turbines, compressors, and the like comprising the steps of forming a generally rectangular sheet metal blank in the shape of the developed blade, forming on portions of said blank at least two sets of spaced ridges extending to the edge of the blank, folding said blank so that said ridged portions abut one another in at least two places, wrapping a shell about said abutting portions for substantially the length of the ridges, and securing the shell to the ridges and to itself.

2. The method of making a rotor blade for turbines, compressors, and the like comprising the steps of forming a generally rectangular sheet metal blank in the shape of the developed blade, forming corrugations on spaced portions of said blank to extend in the same direction and terminating at the edge of the blank, folding the blank so the spaced corrugated portions are brought into abutting alignment in at least two places, wrapping a thin shell about the abutting portions for substantially the length of the corrugations, and securing the shell to the corrugated portions and to itself.

3. The method of making a rotor blade for turbines, compressors, and the like comprising the steps of forming a generally rectangular sheet metal blank in the shape of the developed blade, forming corrugations on spaced portions of said blank to extend in the same direction and terminating at the edge of the blank, folding the blank in half upon itself with a bend at the fold so that the spaced corrugated portions are brought into abutting alignment in at least two places for substantially the length of the corrugations, wrapping a thin shell about the abutting portions and terminating slightly less than the length of the corrugations, and securing the shell to the corrugated portions and to itself.

4. The method of making a rotor blade for turbines, compressors, and the like comprising the steps of forming a generally rectangular sheet metal blank in the shape of the developed blade, forming corrugations on spaced portions of said blank to extend in the same direction and terminating at the edge of the blank, folding the blank in half upon itself with a bend at the fold so that the spaced corrugated portions are brought into abutting alignment in at least two places for substantially the length of the corrugations, securing the corrugated portions together, wrapping a thin shell about the abutting portions and terminating toward the fold slightly less than the length of the corrugations, and securing the shell to the corrugations and to itself.

5. The method of making a rotor blade for turbines, compressors, and the like comprising rolling a tapered sheet of stock of generally triangular cross section, cutting said stock at right angles to the direction of rolling into a generally rectangular blank in the shape of the developed blade, contouring said blank and forming corrugations on each end of said blank and extending part way toward the center of the blank, folding the blank at the thick part of said taper into a bend to bring the corrugations into abutting alignment with one another, wrapping a thin shell completely around the corrugations and extending it toward the bend slightly less than the full length of the corrugations to form passages between the shell and the aligned corrugations and form openings into said passages, and securing said corrugated end portions and said shell to each other.

6. The method of making a rotor blade for turbines, compressors, and the like comprising rolling a tapered sheet of stock of generally triangular cross section, cutting said stock at right angles to the direction of rolling into a generally rectangular blank having a longer dimension in the direction of the cut and a shorter dimension in the rolled direction, simultaneously contouring the blank and forming corrugations on each end parallel to the long dimension and extending part way toward the center of the blank, folding the blank in half at the thick part of said taper to bring the corrugated portions into abutting alignment with one another, encasing said corrugations for slightly less than their full length with a thin shell to form passages between the shell and the aligned corrugation and form openings into said passages, and welding said corrugated end portions and said shell to each other, and welding said shell to itself at its mating edges to form an airfoil.

References Cited in the file of this patent

UNITED STATES PATENTS

| | | |
|---|---|---|
| 1,883,519 | Brauchler | Oct. 18, 1932 |
| 2,013,622 | Bedford | Sept. 3, 1935 |
| 2,394,353 | Zellbeck | Feb. 5, 1946 |
| 2,511,858 | Lampton | June 20, 1950 |
| 2,559,131 | Oestrich | July 3, 1951 |
| 2,650,803 | Rosskopf | Sept. 1, 1953 |
| 2,656,146 | Sollinger | Oct. 20, 1953 |
| 2,708,564 | Erickson | May 17, 1955 |
| 2,762,114 | Steinhauer | Sept. 11, 1956 |
| 2,787,049 | Stalker | Apr. 2, 1957 |